United States Patent [19]
Hale et al.

[11] Patent Number: 5,827,971
[45] Date of Patent: Oct. 27, 1998

[54] OPTICAL VIBRATION DETECTION SPECTRAL ANALYSIS ASSEMBLY AND METHOD FOR DETECTING VIBRATION IN AN OBJECT OF INTEREST

[75] Inventors: Thomas C. Hale, Los Alamos, N. Mex.; Kenneth L. Telschow, Idaho Falls, Id.

[73] Assignee: Lockheed Martin Idaho Technologies Company, Idaho Falls, Id.

[21] Appl. No.: 787,073

[22] Filed: Jan. 22, 1997

Related U.S. Application Data

[60] Provisional application No. 60/018,740 May 31, 1996.
[51] Int. Cl.$^6$ ................................ G01B 9/02; G01H 9/00
[52] U.S. Cl. .............................. 73/657; 73/656; 356/347; 356/349; 359/240
[58] Field of Search ............................. 73/655, 657, 656; 356/349, 354, 350, 360, 347; 359/240

[56] References Cited

U.S. PATENT DOCUMENTS

| | | | |
|---|---|---|---|
| 4,284,324 | 8/1981 | Huignard et al. | 350/3.64 |
| 4,304,458 | 12/1981 | Huignard et al. | 350/3.63 |
| 4,492,468 | 1/1985 | Huignard et al. | 356/347 |
| 5,130,849 | 7/1992 | Valley et al. | 359/571 |
| 5,303,031 | 4/1994 | Khoury et al. | 356/345 |
| 5,335,062 | 8/1994 | Hofmeister et al. | 356/347 |
| 5,335,548 | 8/1994 | Kalibjian | 73/655 |

OTHER PUBLICATIONS

Hale, et al, "Vibration Modal Analysis Using All–Optical Photorefractive Processing", *Proceedings of 1996 SPIE Photorefractive Fiber and Crystal Devices Conference*, Denver, CO, Aug. 4–9 1996, vol. 2849, pp. 300–307.

Chatters, et al, "Optical Lock–In Vibration Detection Using Photorefractive Four–Wave Mixing", *Review of Progress in Quatitative Nondestructive Evaluation*, vol. 15, pp. 2165–2171. Jun. 1996.

Huignard, et al, "Two–Wave Mixing and Energy Transfer in $Bi_{12} SiO_{20}$ Crastals: Application to Image Amplification and Vibration Analysis", *Optic Letters*, vol. 6, No. 12, pp. 622–624, Dec. 1981.

Hale, et al, "Optical Lock–In Vibration Detection Using Photorefractive Frequency Domain Processing", *Applied Physics Letters*, vol. 69, pp. 2632–2634, Oct. 28 1996.

Hofmeister, et al, "Vibration Detection Using Dynamic Photorefractive Gratings in KTN/KLTN Crystals", *Applied Physics Letters*, vol. 61, pp. 2395–2397, Nov. 16, ,1992.

Rohleder, et al, "Quantitative Measurement of the Vibrational Amplitude and Phase in Photorefractive Tie–Average Interferometry: A Comparison with Electronic Speckle Pattern Interferometry", *Journal of Applied Physics*, vol. 76, No. 1, pp. 81–84, Jul. 1, 1994.

Khoury, et al, "Photorefractive Optical Lock–In Detector", *Optic Letters*, vol. 16, No. 18, pp. 1442–1444, Sep. 15, 1991.

*Primary Examiner*—Hezron E. Williams
*Assistant Examiner*—Rose M. Miller
*Attorney, Agent, or Firm*—Wells St John Roberts Gregory & Matkin

[57] ABSTRACT

A vibration detection assembly is described which includes an emitter of light which has object and reference beams, the object beam reflected off of a vibrating object of interest; and a photorefractive substance having a given response time and which passes the reflected object beam and the reference beam, the reference beam and the object beam interfering within the photorefractive substance to create a space charge field which develops within the response time of the photorefractive substance.

37 Claims, 3 Drawing Sheets

OPTICAL VIBRATION DETECTION SPECTRAL ANALYSIS ASSEMBLY AND METHOD FOR DETECTING VIBRATION IN AN OBJECT OF INTEREST

CONTRACTUAL ORIGIN OF THE INVENTION

The United States Government has rights in this invention pursuant to Contract No. DE-AC07-94ID13223 between Lockheed Martin Idaho Technologies Company and The United States Department of Energy.

RELATED APPLICATION DATA

The present application claims priority from Provisional Application Ser. No. 60/018,740, and which was filed on May 31, 1996.

TECHNICAL FIELD

This invention relates to vibration detection assemblies; methods for detecting vibration in objects of interest, and for performing spectral vibration analysis, and more specifically to a device and method which utilize the photorefractive effect in selected materials for the synchronous detection of the optical phase shift of an object beam scattered from a vibrating specimen surface.

BACKGROUND OF THE INVENTION

There are assorted optical techniques for detecting vibration in an object of interest. Some of the techniques used heretofore in applications, such as laser ultrasonics, are based upon time domain processing utilizing homodyne or heterodyne interferometry. In this technique, vibration displacement amplitudes are recorded through interference at the photodetector and through subsequent signal processing. Those skilled in the art will recognize that an interferometer is an instrument in which light from a source is split into two or more beams which are subsequently reunited after traveling over different paths and which display individual interference pattern. The techniques, noted above, typically utilize wide band widths and are usually employed to obtain real-time surface motion under various conditions. As should be understood, in a particular applications such as structural analysis, frequency domain measurements are often considered to be more useful because frequency domain measurements record the randomly or continuously excited vibrational spectrum of the entire object being analyzed.

While the techniques briefly described above have operated, with some degree of success, they do have shortcomings which have detracted from their usefulness. For example, with respect to time domain methods a significant signal to noise ratio improvement can be gained by employing a reduced bandwidth of the measurement as compared to the time domain methods but at the expense of additional processing and complexity. Still a further shortcoming in the optical approaches used heretofore to detect vibration has been the sensitivity of these same methods to speckle reflections from the specimen surface. In this regard, it should be understood that a speckle is a phenomenon which accompanies the scattering of coherent light from a surface. This may occur, for example, when a light source, such as a laser, hits a roughened or inhomogeneous medium and generates a random-intensity distribution of light that gives the surface or medium a granular appearance. These speckle reflections can be corrected by limiting detection to a single speckle, or by using self-beating interferometers such as the Fabry-Perot. Those skilled in the art will recognize that the Fabry-Perot is an optical interference filter interferometer having two parallel glass plates which are silvered on their inner surfaces. These plates work in combination so that an incoming light wave is reflected a multiple number of times between them and ultimately transmitted.

Still a further shortcoming of the prior art techniques relates to the use of the photorefractive effect in optically nonlinear materials. This method provides an active mechanism for compensation using the spatial and temporal characteristics of photorefractivity. In this regard, several optical frequency domain measurement methods have been proposed using photorefractive, two and four wave mixing, in selected materials. These techniques provide a response that is substantially a nonlinear function of the specimen vibration displacement amplitude (typically the Bessel function of order zero) and do not provide a measure of the vibration phase.

Therefore it has long been known that it would be desirable to provide a vibration detection assembly which obtains the individual benefits to be derived from related prior art devices and practices while avoiding the detriments individually associated therewith.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
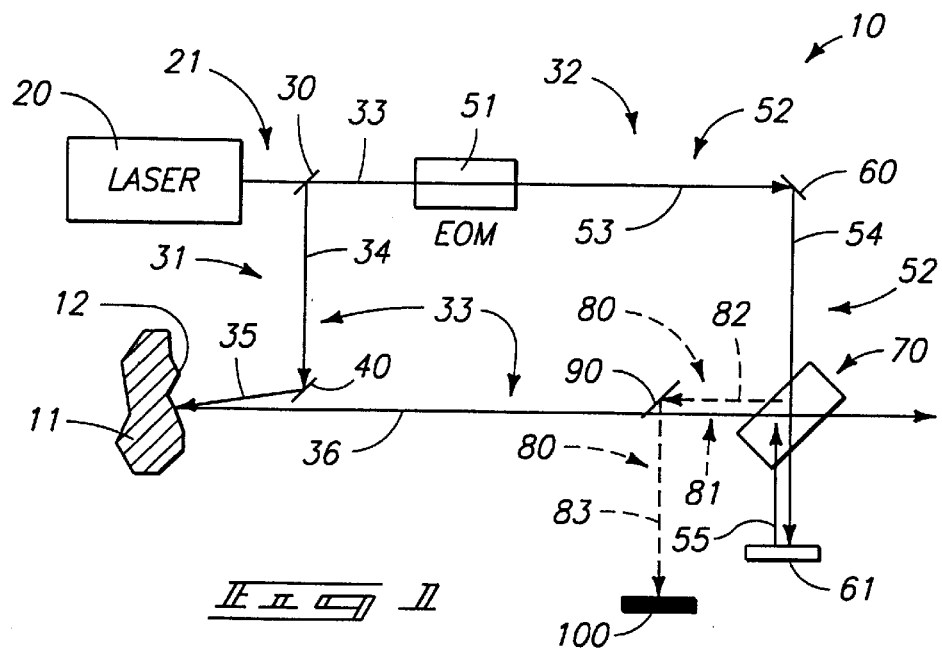
FIG. 1 is a greatly simplified diagrammatic view of the present invention.

The vibration detection assembly or method for detecting vibration in an object of interest of the present invention is generally indicated by the numeral 10 in FIG. 1. As should be understood, the object of interest 11 may be all manner of gas, liquid or solid and the vibration to be detected includes the acoustic or ultrasonic motion of the gas, liquid or solid. In the present illustration as shown in FIG. 1, the object of interest 11 has a surface 12 which is vibrating at a given frequency. As seen in FIG. 1, the present invention 10 includes an emitter of light 20, and preferably a laser, such as an argon laser, which emits light having a substantially fixed wavelength and a predetermined luminous output, for example 514 nanometers and 200 mW. The light generated by the laser is transmitted along a first beam path which is generally indicated by the numeral 21.

The present invention 10 includes a beam splitter 30 of conventional design. The first beam splitter 30 is oriented along the first beam path 21, and is effective in providing object and reference beams 31 and 32 respectively. The object beam 31 which travels along the second beam path 33, has several courses. These include a first course 34; a second course 35; and a third course 36. As seen in FIG. 1, a mirror 40, is located in a predetermined location to reflect the object beam 31, traveling along the first course 34, in the direction of the vibrating specimen 12. The reflected light from the beam splitter 40 travels along the second course 35, reflects off of the vibrating surface 12, and travels back along the third course 36. The object beam 31 which is reflected off of the vibrating object of interest 11 has a given vibration displacement amplitude and vibration phase.

Light generated by the light emitter 20, and more specifically the reference beam 32 thereof, travels along a third beam path which is generally indicated by the numeral 33. This reference beam 32 is acted upon by an electro-optic or other suitable phase modulator (EOM) 51 of conventional design. The electro-optic phase modulator modulates the reference beam at a substantially fixed modulation depth as will be discussed in greater detail hereinafter. The reference beam 32 which has been acted upon the electro-optic phase modulator 51, emerges as a modulated reference beam which is directed along a fourth beam path 52. The fourth beam path includes first, second and third courses 53, 54 and 55 respectively. A first mirror 60 is positioned in a given location to reflect the modulated reference beam 32 along the second course 54, and a second mirror 61 is positioned in a given location to reflect the light in a counterpropating path along the third course 55. Positioned at a given location along both the second course 54 of the fourth beam path 52, and the third course 36 of the second beam path 31, is a photorefractive substance 70. In the preferred form of the invention the photorefractive substance 60 comprises a crystal of bismuth silicon oxide having an optically produced photorefractive grating at a predetermined Bragg angle. Other photorefractive substances could be employed with equal success. As should be understood, the modulated reference beam 32 is combined and interferes with the object beam 31 inside the bismuth silicon oxide crystal at an external angle of about 55 degrees to create a space charge field which develops within the responsive time of same. The modulated reference beam 32 passes through the photorefractive substance 70 at a given external angle to form a conjugate signal beam 80 which is directed along a fifth beam path 81. The fifth beam path 81 has a first course 82, and a second course 83, respectively. A second beam splitter 90 is positioned between the first and second courses 82 and 83, the second course 83 being directed at a photodetector 100 which is located at the termination thereof.

As should be understood, as a result of the response time, the photorefractive substance 70 also has a given cutoff frequency, and the modulated reference beam 32 has a frequency difference which is less than about the cutoff frequency of the photorefractive substance 70. Further, the measurement device or photodetector 100 which is positioned along the fifth beam path 81 measures both the vibration amplitude and the phase of the object of interest 11.

As noted above, the second and third courses 54 and 55 of the fourth beam path 52 are counter-propagating. The third course 55 scatters from the grating of the photorefractive substance 70 to form the conjugate beam 80. In the preferred form of the invention 10 the reflected object beam 31 traveling along the third course 36, has a given frequency, and the reference beam 32 has a frequency which is offset by an amount of about 25 hertz from the given frequency of the reflected object beam. In the case where the photorefractive substance 70 is a material such a bismuth silicon oxide, the cutoff frequency of such bismuth silicon oxide is about 70 Hz. and the response time of same is about 0.015 seconds.

In operation, the excited vibrational modes of the object of interest 11 determines the frequency-dependent displacement amplitude of the sample surface 12 which, in turn, is transferred into the phase modulation of the object beam 31 which travels along the third course 36. As earlier discussed, the reference beam 32 is phase modulated by the electro-optic phase modulator 51 at a fixed modulation depth. The modulated reference beam and the reflected object beam are then combined and interfere inside a photorefractive substance, such as bismuth silicon oxide 70, at an external angle of about 55 degrees. In the present invention 10, a four-wave mixing configuration is used for demodulation of the photorefractive interference grating produced within the photorefractive substance 70. The reference beam 32 is reflected back into the photorefractive substance 70 along a counter-propagating course 55 that matches the Bragg angle of the photorefractive grating produced in the photorefractive substance 70. The resulting scattered wave or conjugate signal beam 80 moves along the fifth beam path 81 and is then sampled at the second beam splitter 90 and deflected toward the photodetector 100.

The present invention can be employed in different modes. In each of the modes, which will be described below, the photorefractive substance 70 acts as a mixing and low pass filtering element. The measured signal intensity can be calculated for each of these modes using a time-dependent photorefractive first order response theory in the single grating approximation. The results of such calculation, which retains only the most dominant terms, is described by the following equation and, wherein 61 equals the phase modulation of the object beam; 62 is the fixed modulation depth of modulated reference beam 32; T is the photorefractive time constant and $\Omega=\omega_2-\omega_1$; $\Omega\tau=\tan(\psi)$ and $(\omega_1-\omega_2)$ is the relative phase difference between the vibrating specimen surface and the electro-optic frequency modulator 51:

$$I(t) \sim J_o(\delta_1)J_1(\delta_1)J_o(\delta_2)J_1(\delta_2) \frac{\cos(\Omega t + \Psi - (\phi_1 - \phi_2))}{\sqrt{1+\Omega^2\tau^2}}$$

Figure 2:
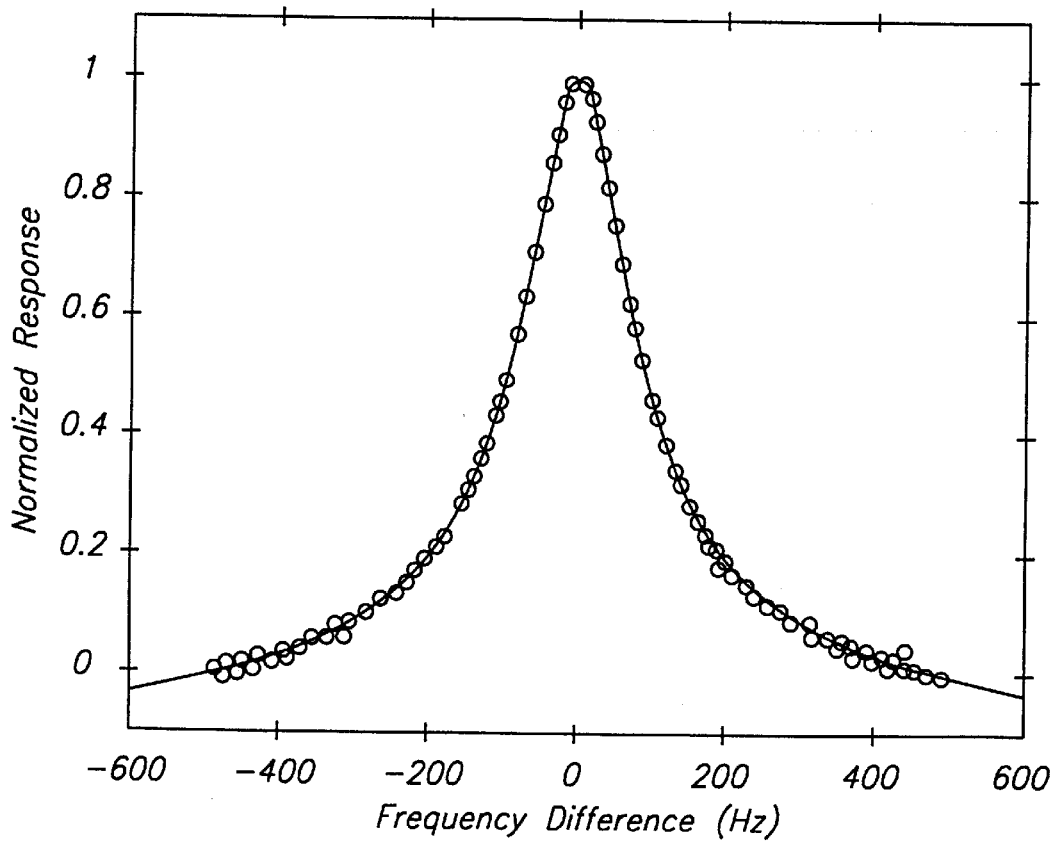
FIG. 2 is a graphical representation of the measurement of a surface vibrating at a fixed frequency while the reference frequency is swept by a predetermined amount.

In the first mode of the present invention 10, as seen in FIG. 2, a random excitation is applied to the object of interest 11 while the electro-optic frequency modulator 51 is driven at a fixed modulation depth and at the measurement frequency. Further, the reference frequency $\omega_2$ is then scanned across the range of interest while monitoring the rms response at the photodetector 100. In this mode, when the reference frequency approaches a vibrating mode of the specimen 12 at a given characteristic frequency, $\omega_1$, the response increases resulting in the power spectrum of the vibration. Consequently, this mode results in phase sensitivity demanding that the path lengths be constant for all optical beams and that there are no other phase noise sources present. To employ this mode of the invention 10, a path stabilization scheme must be implemented as is commonly done in homodyne interferometers used for this purpose. Further, a quadrature dual detection scheme may also be employed. To provide the results as shown in FIG. 2, the object of interest 12 comprising a reflecting mirror surface was selected and driven externally at a fixed frequency $\omega_1$. When the reference beam frequency $\omega_2$ was near the fixed frequency $\omega_1$, the response was seen as a direct measure of the bandwidth of the photorefractive substance 70. FIG. 2 further shows the measurement results along with the solid curve from the equation, above, utilizing a response time of approximately 0.015 seconds for the bismuth silicon oxide photorefractive crystal 70 found at the particular mixing intensities and grating spacing. As will be recognized, the measured intensity is proportional to the vibrational displacement for small amplitudes from the equation noted above. As will further be recognized, two closely space vibrational modes are not resolved beyond the intrinsic bandwidth of the photorefractive substance 70.

Figure 3:
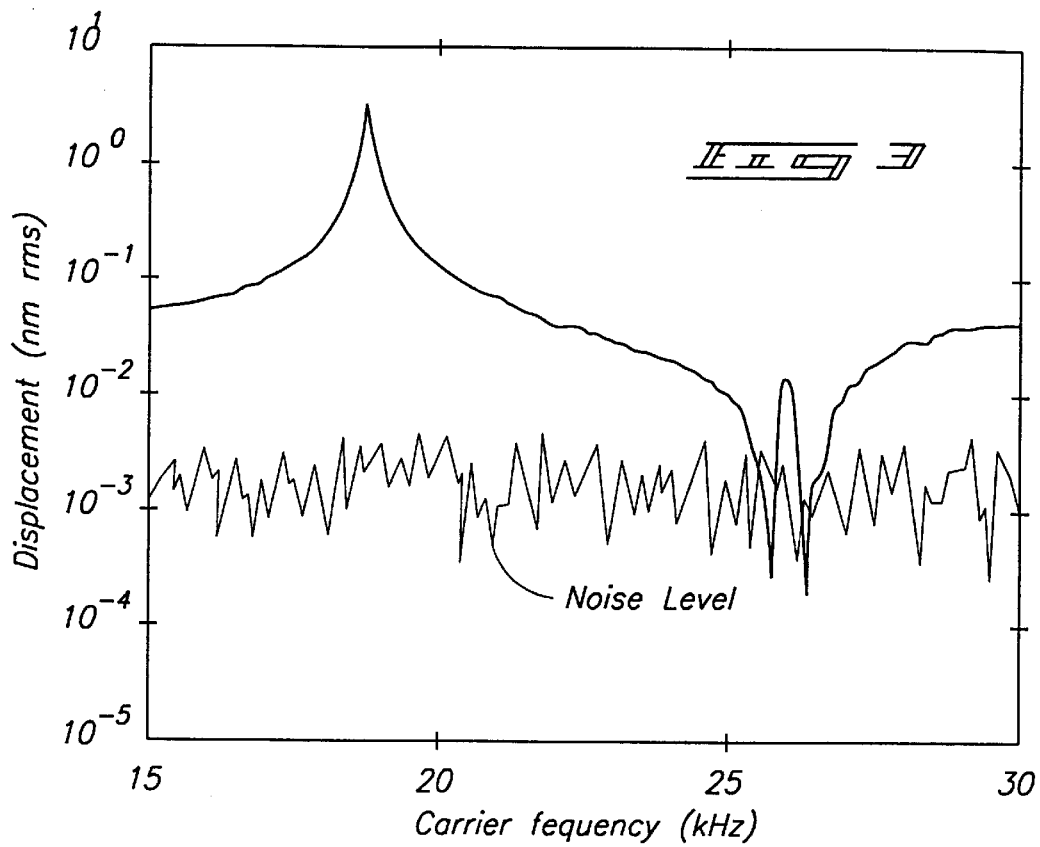
FIG. 3 is a graphical representation of an amplitude spectrum of a synchronously driven vibrating surface, and which shows the fundamental resonance and an associated noise level.
Figure 4:
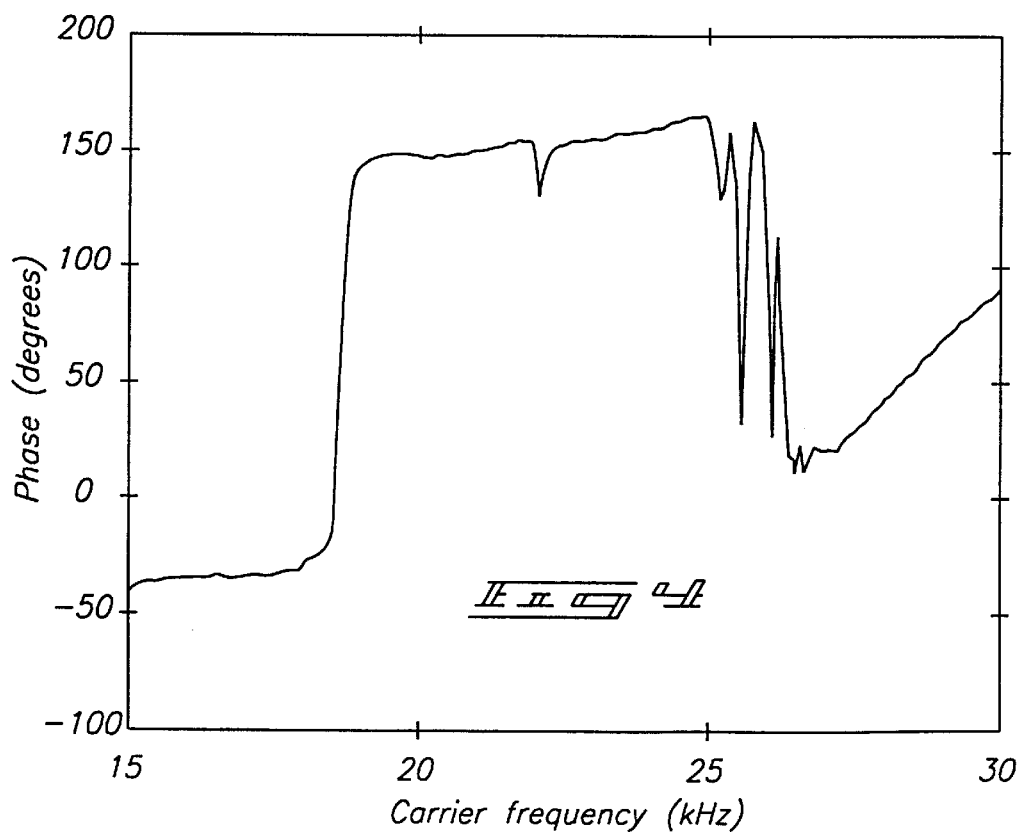
FIG. 4 is a graphical representation of the corresponding phase spectrum.
Figure 5:
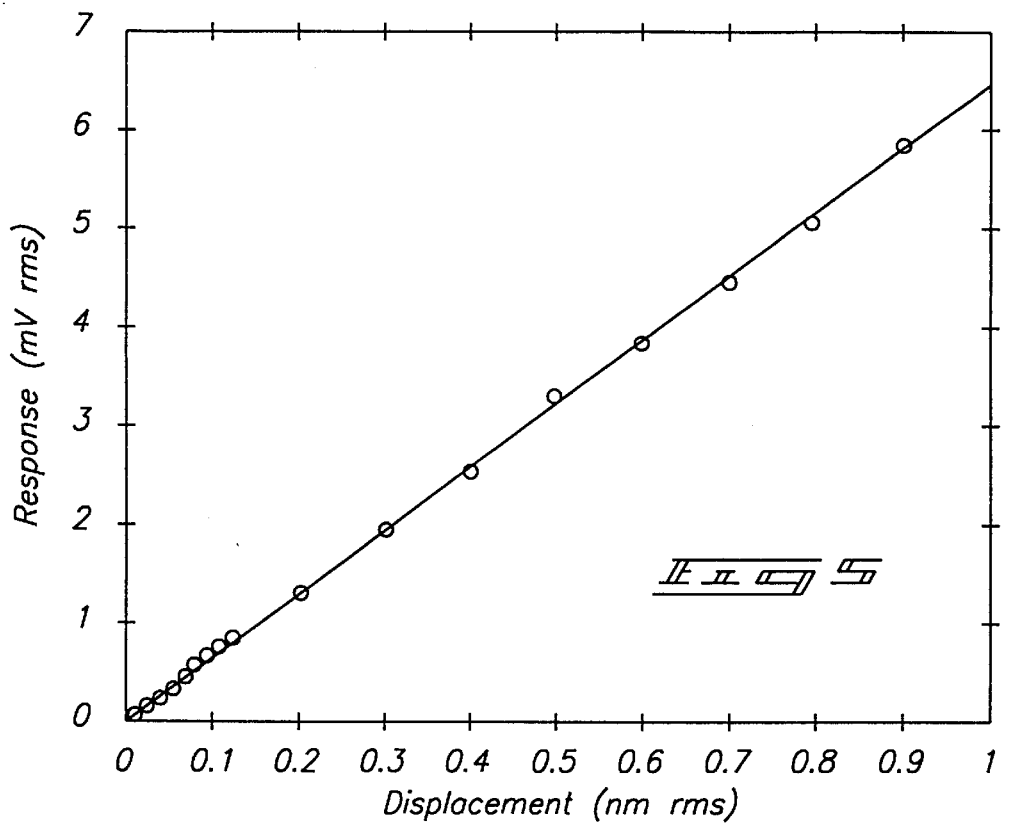
FIG. 5 is a graphical representation of a linear response of the wave mixing process as compared to specimen vibration displacement.
Figure 6:
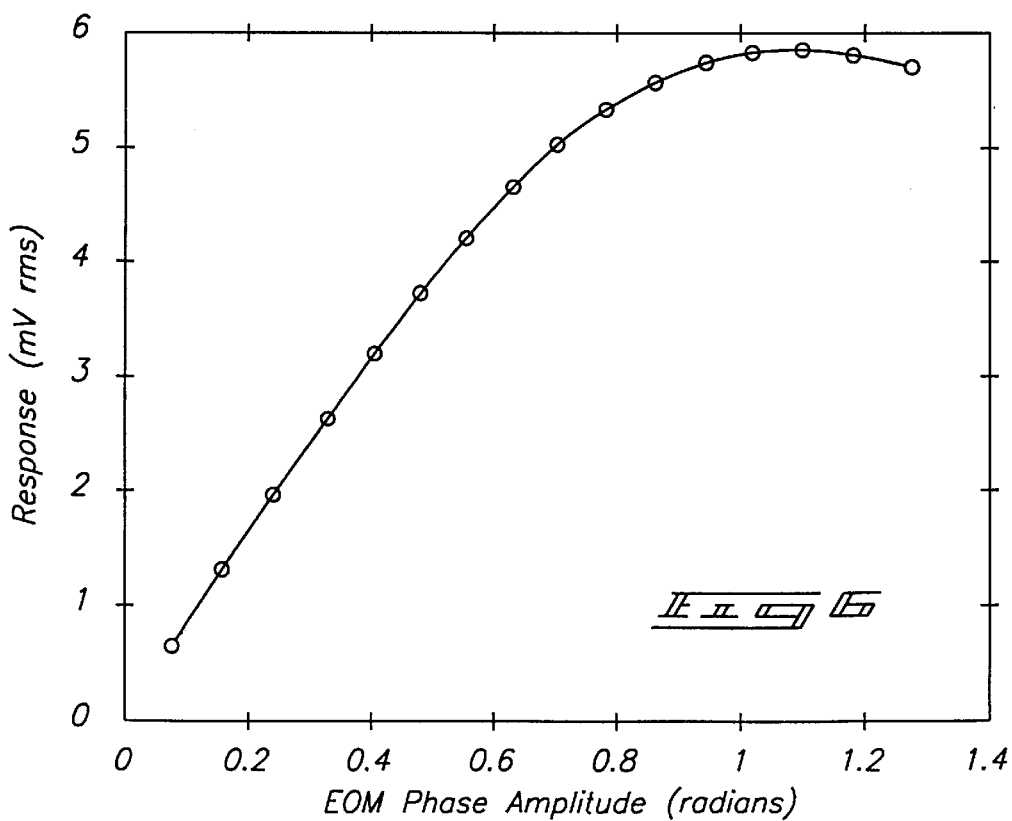
FIG. 6 is a graphical representation of the effect of the electro-optic modulation amplitude on the wave mixing process.

In the aforementioned mode of the invention 10, the strong dependence of the results on the path dependent phase shift $(\phi_1-\phi_2)$ can be reduced by shifting the measurement to a fixed offset frequency $(\Omega<1/\tau)$. This constitutes, the second mode of operation of the present invention 10. In this second mode, the object excitation and reference modulation are maintained coherent at a fixed frequency difference $(\Omega/2\pi=25$ Hz$)$. This second mode insures that the AC, or beat component of the conjugate signal beam 70 intensity at 25 Hz. is always present at the photodetector 100. The output of the second mode is demodulated by a conventional lock-in amplifier (not shown), yielding a noise limiting bandwidth that can be set less than the bandwidth of the photorefractive substance 70. By utilizing this approach, both the vibration amplitude, and phase of the vibrating object of interest 11 can be directly measured by the light intensity at the photodetector 100. It should be recognized that this method discriminates against static or time varying phase shifts outside the given bandwidth and can be extended to vibration frequencies from the reciprocal of the photorefractive response time (67 Hz.), to the reciprocal of the recombination time of the photorefractive substance 70 (approximately 10 MHz.). Referring now to FIG. 3, the displacement amplitude versus the frequency of an object of interest is shown. To produce these results, a vibrating mirror was employed and is shown with a solid line. The noise level is labeled as such. These results were obtained with a net demodulated power on the photodetector 100 of approximately 5 microwatts, and a bandwidth of approximately 1 Hz. The pronounced fundamental mechanical resonance at 18.6 kHz is clearly shown along with a noise level corresponding to a minimum displacement sensitivity of approximately 0.02 Angstroms. As will be appreciated following a study of FIG. 3, the arrangement as employed in FIG. 1 allows a quantitative determination of the displacement amplitude by comparison of the known response of the electro-optic phase modulator 51 which is calibrated with homodyne interferometry. The corresponding phase of the mirror specimen spectrum is shown in FIG. 4. FIG. 5 shows the measured linear response of the displacement amplitude at 15 kHz with respect to mirror motion, and FIG. 6, the electro-optic phase modulator contribution in the above noted equation in terms of the Bessel function product. The data shown in FIGS. 2–6 support the model predicting equation earlier set forth.

OPERATION

The operation of the present invention is believed to be readily apparent and is briefly summarized at this point. The vibration detection assembly, and method for detecting vibration in an object of interest is best understood by a study of FIG. 1. As shown therein, the vibration detection assembly 10 comprises an emitter of light 20 which has object and reference beams 31 and 32 respectively, the object beam 31 reflected off of a vibrating object of interest 12; and a photorefractive substance 70 having a given response time and which passes the reflected object beam 31 and the reference beam 32, the reference beam and the object beam interfering within the photorefractive substance 70 to create a space charge field which develops within the response time of the photorefractive substance.

Another aspect of the present invention relates to a vibration detection assembly 10 comprising an emitter of light 20 which has object and reference beams 31 and 32, the object beam 31 reflected off of a vibrating object of interest 12; a photorefractive substance 70 having a given cutoff frequency and which passes the reflected object beam 31 and reference beam 32, and wherein the reference beam 32 has a frequency of less than about the cutoff frequency of the photorefractive substance 70, the reference beam and the object beam interfering within the photorefractive substance 70 to create a space charge field; and a measurement device 100 operable to measure changes in the space charge field of the photorefractive substance 70.

Still a further aspect of the present invention relates to a vibration detection assembly 10 comprising an emitter of light 20 which has object and reference beams 31 and 32 respectively, the object beam 31 reflected off of a vibrating object of interest 12 and having a vibration displacement amplitude and a vibration phase; and a photorefractive substance 70 which passes the reflected object beam 31 and the reference beam 32, the reference beam and the object beam interfering within the photorefractive substance 70 to create a space charge field having a magnitude which is directly proportional to the vibration displacement amplitude and a cosine function of the vibration phase.

Yet still another aspect of the present invention relates to a vibration detection assembly 10 comprising an emitter 20 producing light which has object and reference beam components 31 and 32, the object beam 31 reflected off of a vibrating object of interest 12; a phase modulator 51 which receives the reference beam 32 and which emits a modulated reference beam; a photorefractive substance 70 which passes the reflected object beam 31 and the modulated reference beam 32, the modulated reference beam and the reflected object beam interfering within the photorefractive substance 70 to create a space charge field; and a measurement device 100 operable to measure changes in the space charge field.

Another aspect of the present invention relates to a method for detecting vibration in an object of interest 12 comprising providing a source of light 20 having object and reference beams 31 and 32 respectively; reflecting the object beam 31 off of the object of interest 12; phase modulating the reference beam to provide a modulated reference beam; providing a photorefractive substance 70 and passing the modulated reference beam 32 and the object beam 31 through the photorefractive substance 70, the modulated reference beam and the object beam combining and interfering within the photorefractive substance to create a space charge field; and providing a measurement device 100 for measuring the magnitude of the space charge field.

Yet further, the method for detecting vibration in an object of interest 12 further comprises providing a source of light 20 having a given bandwidth and directed along a first beam path 21; splitting the source of light into an object beam 31 and a reference beam 32; directing the object beam 31 at the object of interest and along a second beam path 33, the object beam 31 reflecting off of the object of interest 12, and the reference beam directed along a third beam path 50; phase modulating the reference beam to provide a modulated reference beam, the modulated reference beam directed along a given fourth beam path 52; providing a photorefractive substance 70 along the given second and fourth beam paths 33 and 52 respectively, the modulated reference beam and the object beam combining and interfering within the photorefractive substance 70 to form a conjugate beam 80 which is scattered from the grating of the photorefractive substance 70; directing the conjugate beam 80 which has been scattered from the photorefractive substance along a given fifth beam path 81; and providing a photodetector 100 along the fifth beam path. As will be recognized, various other means may be used to measure the space charge field. Each of these means will work with equal success.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A vibration detection assembly, comprising:
    an emitter of light which has object and reference beams, the object beam reflected off of a vibrating object of interest; and
    a photorefractive substance having a given response time, and which passes the reflected object beam and the reference beam, the reference beam and the object beam interfering within the photorefractive substance to create a space charge field which develops within the response time of the photorefractive substance, and wherein the photorefractive substance has a cut-off frequency, and wherein the reference beam has a frequency of less than the cut-off frequency of the photorefractive substance.

2. A vibration detection assembly as claimed in claim 1, wherein the object and reference beams are mixed within the photorefractive substance to create the space charge field, and wherein the space charge field is within the photorefractive substance.

3. A vibration detection assembly as claimed in claim 1, and further comprising a measurement device for detecting changes in the space charge field, and wherein the reflected object beam has a given frequency, and the reference beam has a frequency which is offset by an amount of about 25 Hz from the given frequency of the reflected object beam.

4. A vibration detection assembly as claimed in claim 1, wherein the photorefractive substance comprises bismuth silicon oxide, and wherein the response time is about 0.015 seconds.

5. A vibration detection assembly, comprising:
    an emitter of light which has object and reference beams, the object beam reflected of a vibrating object of interest:
    a photorefractive substance having a given response time, and which passes the reflected object beam and the reference beam, the reference beam and the object beam interfering within the photorefractive substance to create a space charge field which develops within the response time of the photorefractive substance: and
    a phase modulator which receives the reference beam and which emits a modulated reference beam, and wherein the photorefractive substance has a given cut-off frequency, and the modulated reference beam has a frequency of less than the cut-off frequency of the photorefractive substance.

6. A vibration detection assembly, comprising:
    an emitter of light which has object and reference beams, the object beam reflected off of a vibrating object of interest;
    a photorefractive substance having a given cut-off frequency and which passes the reflected object beam and the reference beam, and wherein the reference beam has a frequency of less than the cut-off frequency of the photorefractive substance, the reference beam and the object beam interfering within the photorefractive substance to create a space charge field; and
    a measurement device operable to measure changes in the space charge field of the photorefractive substance.

7. A vibration detection assembly as claimed in claim 6, wherein the object beam reflected off of the vibrating object of interest has a vibration displacement amplitude, and a vibration phase, and wherein the space charge field has a derived value which is directly proportional to the vibration displacement amplitude, and is a cosine function of the vibration phase.

8. A vibration detection assembly as claimed in claim 6, wherein the object beam incident on the vibrating object of interest has a given frequency, and the reference beam has a frequency which is offset by an amount of less than the photorefractive cut-off frequency from the given frequency of the object beam.

9. A vibration detection assembly as claimed in claim 6, and further comprising a frequency modulator which receives the reference beam and which emits a modulated reference beam, and wherein the modulated reference beam has a frequency of less than the cut-off frequency of the photorefractive material, and wherein the photorefractive material is bismuth silicon oxide, and the cut-off frequency of bismuth silicon oxide is about 70 Hz.

10. A vibration detection assembly as claimed in claim 6, wherein the space charge field develops in the photorefractive substance within a given response time of the photorefractive substance, and wherein the photorefractive substance comprises bismuth silicon oxide having a response time of about 0.015 seconds.

11. A vibration detection assembly as claimed in claim 6, wherein the measurement device directly measures both the vibration amplitude and the vibration phase of the object of interest.

12. A vibration detection assembly as claimed in claim 6, wherein the object of interest is a gas, liquid or solid, and the vibration includes the acoustic or ultrasonic motion of the gas, liquid or solid.

13. A vibration detection assembly as claimed in claim 6, and further comprising a frequency modulator which receives the reference beam and which emits a modulated single sideband reference beam which has a frequency different from the object beam by a fixed amount and which is less than the cut-off frequency of the photorefractive substance.

14. A vibration detection assembly, comprising:
    an emitter of light which has object and reference beams, the object beam reflected off of a vibrating object of interest and having a vibration displacement amplitude, and a vibration phase; and
    a photorefractive substance which passes the reflected object beam and the reference beam, the reference beam and the object beam interfering within the photorefractive substance to create a space charge field having a derived value which is directly proportional to the vibration displacement amplitude, and a cosine function of the vibration phase, and wherein the photorefractive substance has a cut-off frequency, and wherein the reference beam has a frequency different from the object beam by a fixed amount which is less than the cut-off frequency of the photorefractive substance.

15. A vibration detection assembly comprising:
an emitter of light which has object and reference beams, the object beam reflected off of a vibrating object of interest and having a vibration displacement amplitude, and a vibration phase; and
a photorefractive substance which passes the reflected object beam and the reference beam, the reference beam and the object beam interfering within the photorefractive substance to create a space charge field having a derived value which is directly proportional to the vibration displacement amplitude, and a cosine function of the vibration phase, and wherein the photorefractive substance has a cut-off frequency, and response time, and wherein the reference beam has a frequency different from the object beam by a fixed amount and which is less than the cut-off frequency of the photorefractive substance, and wherein the space charge field develops within the response time of the photorefractive substance.

16. A vibration detection assembly as claimed in claim 15, wherein the object and reference beams are mixed within the photorefractive substance to create the space charge field, and wherein the space charge field is within the photorefractive substance.

17. A vibration detection assembly as claimed in claim 15, and further comprising a measurement device for detecting changes in the space charge field, and wherein the reflected object beam has a given frequency, and the reference beam has a frequency which is offset by an amount of about 25 Hz from the given frequency of the reflected object beam.

18. A vibration detection assembly as claimed in claim 17, wherein the measurement device directly measures both the vibration amplitude and the vibration phase of the object of interest.

19. A vibration detection assembly as claimed in claim 15, wherein the photorefractive substance comprises bismuth silicon oxide which has a response time of about 0.015 seconds.

20. A vibration detection assembly as claimed in claim 15, wherein the object of interest is a gas, liquid or solid, and the vibration includes the acoustic or ultrasonic motion of the gas, liquid or solid.

21. A vibration detection assembly, comprising:
an emitter of light which has object and reference beams, the object beam reflected off of a vibrating object of interest and having a vibration displacement amplitude, and a vibration phase;
a photorefractive substance which passes the reflected object beam and the reference beam, the reference beam and the object beam interfering within the photorefractive substance to create a space charge field having a derived value which is directly proportional to the vibration displacement amplitude, and a cosine function of the vibration phase and wherein the photorefractive substance has a cut-off frequency; and
a phase modulator which receives the reference beam and which emits a modulated single sideband reference beam which has a frequency different from the object beam by a fixed amount and which is less than the cut-off frequency of the photorefractive substance.

22. A vibration detection assembly comprising:
an emitter producing light which has object and reference beams, the object beam reflected off of a vibrating object of interest;
a phase modulator which receives the reference beam and which emits a modulated reference beam;
a photorefractive substance which passes the reflected object beam and the modulated reference beam, the modulated reference beam and the reflected object beam interfering within the photorefractive substance to create a space charge field, and wherein the photorefractive substance has a cut-off frequency, and wherein the modulated reference beam has a frequency difference of less than the cut-off frequency of photorefractive substance, and wherein the photorefractive substance is bismuth silicon oxide which has a cut-off frequency of about 70 Hz.; and
a measurement device operable to measure changes in the space charge field.

23. A vibration detection assembly as claimed in claim 22, wherein the photorefractive substance has a given response time, and wherein the bismuth silicon oxide has a response time of about 0.015 seconds.

24. A vibration detection assembly as claimed in claim 22, wherein the reflected object beam has a given vibration amplitude and vibration phase, and wherein the measurement device directly measures both the vibration amplitude and the vibration phase of the object of interest.

25. A vibration detection assembly comprising:
an emitter producing light which has object and reference beams, the object beam reflected off of a vibrating object of interest;
a phase modulator which receives the reference beam and which emits a modulated reference beam:
a photorefractive substance which passes the reflected object beam and the modulated reference beam, the modulated reference beam and the reflected object beam interfering within the photorefractive substance to create a space charge field, and wherein the photorefractive substance has a cut-off frequency, and the modulated reference beam has a frequency difference of less than the cut-off frequency of the photorefractive substrate; and
a measurement device operable to measure changes in the space charge field, and wherein the object of interest is a gas, liquid or solid, and the vibration includes the acoustic or ultrasonic motion of the gas, liquid or solid.

26. A vibration detection assembly, comprising:
a source of light directed along a given first beam path;
a beam splitter positioned along the first beam path, the beam splitter forming object and reference beams, the object beam reflecting off of a vibrating object of interest and along a given second beam path, and wherein the reference beam is directed along a given third beam path, and wherein the reflected object beam has a given vibration amplitude and phase;
a phase modulator positioned along the third beam path and forming is a modulated reference beam which is directed along a fourth beam path, the modulated reference beam having a frequency which is substantially constant and single sideband;
a photorefractive substance positioned along the second and fourth beam paths, the object and modulated reference beams passing through the photorefractive substance at a given external angle to form a conjugate signal beam, the conjugate signal beam directed along a fifth beam path, and wherein the photorefractive substance has a cut-off frequency, and the modulated reference beam has a frequency different from the object beam by a fixed amount and which is less than the cut-off frequency of the photorefractive substance; and a photodetector positioned along the fifth beam path and which measures both the vibration amplitude and phase of the object of interest.

27. A vibration detection assembly as claimed in claim 26, wherein the source of light comprises a laser which emits light having a substantially fixed wavelength and a predetermined luminous output.

28. A vibration detection assembly as claimed in claim 26, wherein the fourth beam path has first and second courses, and wherein the first and second courses pass through the photorefractive substance and along substantially parallel beam paths.

29. A vibration detection assembly as claimed in claim 26, wherein the phase modulator comprises an electro-optic modulator which phase modulates the reference beam at a substantially fixed modulation depth.

30. A vibration detection assembly as claimed in claim 26, wherein the photorefractive substance comprises a crystal of bismuth silicon oxide, and wherein the modulated reference beam is combined and interferes inside the bismuth silicon oxide crystal with the object beam at an external angle of about 55 degrees.

31. A vibration detection assembly as claimed in claim 26, wherein the photorefractive substance comprises a crystal of bismuth silicon oxide having a photorefractive grating with a predetermined Bragg angle, and wherein the modulated reference beam is combined and interferes inside the bismuth silicon oxide crystal with the object beam at an external angle of about 55 degrees, and wherein the modulated reference beam passes through the bismuth silicon oxide crystal and is reflected back into the bismuth oxide crystal along a counter-propagating beam path that substantially matches the photorefractive grating of the bismuth oxide crystal.

32. A vibration detection assembly as claimed in claim 26, and further comprising a second beam splitter disposed along the second and fifth beam paths, and wherein the fifth beam path has first and second courses, and wherein the photodetector is positioned along the second course.

33. A vibration detection assembly as claimed in claim 26, wherein the object beam incident on the vibrating object of interest has a given frequency, and the reference beam has a frequency which is offset by an amount of less than the photorefractive cut-of frequency from the given frequency of the reflected object beam.

34. A vibration detection assembly as claimed in claim 26, wherein the photorefractive substance has a cut-off frequency, and wherein the modulated reference beam has a frequency different from the object beam by a fixed amount and which is less than the cut-off frequency of the photorefractive substance, and wherein the photorefractive substance is bismuth silicon oxide which has a cut-off frequency of about 70 Hz.

35. A vibration detection assembly as claimed in claim 26, wherein the photorefractive substance has a given response time, and wherein the photorefractive substance comprises bismuth silicon oxide which has a response time of about 0.015 seconds.

36. A vibration detection assembly as claimed in claim 26, wherein the photorefractive substance has a cut-off frequency, and the modulated reference beam has a frequency different from the object beam by a fixed amount and which is less than the cut-off frequency of the photorefractive substance, and wherein the object of interest is a gas, liquid or solid, and the vibration includes the acoustic or ultrasonic motion of the gas, liquid or solid.

37. A vibration detection assembly as claimed in claim 26, wherein the reference and reflected object beams passing through the photorefractive substance creates a space charge field, and wherein the photorefractive substance has a given response time, and wherein the space charge field develops within the response time of the photorefractive substance.

* * * * *